(12) United States Patent
Kim

(10) Patent No.: US 10,449,946 B2
(45) Date of Patent: Oct. 22, 2019

(54) METHOD FOR CONTROLLING DRIVING OF A HYBRID VEHICLE

(71) Applicants: HYUNDAI MOTOR COMPANY, Seoul (KR); KIA MOTORS CORPORATION, Seoul (KR)

(72) Inventor: Do Hee Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 4 days.

(21) Appl. No.: 15/792,515

(22) Filed: Oct. 24, 2017

(65) Prior Publication Data

US 2018/0208176 A1    Jul. 26, 2018

(30) Foreign Application Priority Data

Jan. 23, 2017  (KR) .................. 10-2017-0010647

(51) Int. Cl.
*B60W 20/12* (2016.01)
*B60W 20/13* (2016.01)
*B60W 30/16* (2012.01)
*B60W 30/18* (2012.01)

(52) U.S. Cl.
CPC ............ *B60W 20/12* (2016.01); *B60W 20/13* (2016.01); *B60W 30/16* (2013.01); *B60W 30/18127* (2013.01); *B60L 2240/12* (2013.01); *B60W 2520/10* (2013.01); *B60W 2550/20* (2013.01); *B60W 2550/22* (2013.01); *B60W 2550/30* (2013.01); *B60W 2550/308* (2013.01); *B60W 2550/402* (2013.01); *B60W 2550/408* (2013.01)

(58) Field of Classification Search
CPC ..... B60W 2550/402; B60W 2550/408; B60W 2550/22; B60W 2550/308; B60W 2550/30; B60W 2550/20; B60W 20/12; B60W 20/13; B60W 30/16; B60W 30/18127; B60W 2520/10; B60L 2240/12
USPC ........................................................ 701/123
See application file for complete search history.

(56) References Cited

U.S. PATENT DOCUMENTS

| | | | |
|---|---|---|---|
| 6,554,088 B2 * | 4/2003 | Severinsky | B60H 1/004 180/65.23 |
| 2007/0282520 A1 * | 12/2007 | Cradick | B60W 10/06 701/123 |
| 2011/0246004 A1 * | 10/2011 | Mineta | G01C 21/3469 701/22 |
| 2011/0288712 A1 * | 11/2011 | Wang | B60K 6/445 701/22 |

(Continued)

*Primary Examiner* — Jelani A Smith
*Assistant Examiner* — Melanie J Patrick
(74) *Attorney, Agent, or Firm* — Morgan, Lewis & Bockius LLP

(57) ABSTRACT

A method for controlling driving of a hybrid vehicle includes: calculating, by a controller, an amount of short distance energy reduction, an amount of middle distance energy reduction, and an amount of long distance energy reduction of the hybrid vehicle based on forward driving information of the hybrid vehicle according to a distance; determining, by the controller, a maximum amount of energy reduction by comparing the amount of short distance energy reduction, the amount of middle distance energy reduction, and the amount of long distance energy reduction; and controlling, by the controller, the hybrid vehicle to travel based on the maximum amount of energy reduction.

9 Claims, 5 Drawing Sheets

(56) References Cited

U.S. PATENT DOCUMENTS

| | | | |
|---|---|---|---|
| 2015/0258984 A1* | 9/2015 | Atluri | B60W 10/06 |
| | | | 701/22 |
| 2018/0043896 A1* | 2/2018 | Lee | B60L 7/18 |
| 2018/0190128 A1* | 7/2018 | Saigusa | G08G 1/22 |

* cited by examiner

METHOD FOR CONTROLLING DRIVING OF A HYBRID VEHICLE

CROSS-REFERENCE TO RELATED APPLICATION

This application claims the benefit of priority to Korean Patent Application No. 10-2017-0010647 filed in the Korean Intellectual Property Office on Jan. 23, 2017, the entire content of which is incorporated herein by reference.

TECHNICAL FIELD

The present disclosure relates to a control method for a vehicle, and more particularly, to a method for controlling driving of a hybrid vehicle.

BACKGROUND

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle can consist of an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle can consist of a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a method for controlling driving of a hybrid vehicle which is capable of classifying forward driving information of the hybrid vehicle according to a distance of the forward driving information and of improving energy efficiency of the vehicle based on the classified information.

According to an exemplary embodiment of the present disclosure, a method for controlling driving of the hybrid vehicle includes: calculating, by a controller, an amount of short distance energy reduction, an amount of middle distance energy reduction, and an amount of long distance energy reduction of the hybrid vehicle based on forward driving information of the hybrid vehicle according to a distance; determining, by the controller, a maximum amount of energy reduction by comparing the amount of short distance energy reduction, the amount of middle distance energy reduction, and the amount of long distance energy reduction; and controlling, by the controller, the hybrid vehicle to travel based on the maximum amount of energy reduction.

The method for controlling driving of the hybrid vehicle may further include: receiving, by the controller, the forward driving information. The forward driving information may include sensor data indicating a distance between the hybrid vehicle and a forward vehicle of the hybrid vehicle or communication data received in the hybrid vehicle.

The controlling the hybrid vehicle may include: controlling, by the controller, the hybrid vehicle to travel in an electric vehicle mode based on short distance driving information that is the communication data.

The short distance driving information may be communication data between the hybrid vehicle and a forward vehicle of the hybrid vehicle.

The controlling the hybrid vehicle may include: controlling, by the controller, the hybrid vehicle to perform regenerative braking based on middle distance driving information which is the communication data.

The middle distance driving information may include traffic signal information.

The controlling the hybrid vehicle may include: controlling, by the controller, the hybrid vehicle to travel in an electric vehicle mode or to perform regenerative braking based on long distance driving information that is the communication data.

The long distance driving information may include traffic flow information.

The method for controlling driving of the hybrid vehicle according to the exemplary embodiment of the present disclosure may control driving of the vehicle based on forward driving situation information of the hybrid vehicle, so that the fuel efficiency of the vehicle may be improved.

The exemplary embodiment of the present disclosure may increase the fuel efficiency of the vehicle on a road or a real road using the forward driving situation information of the vehicle and communication information between vehicles.

Further, the exemplary embodiment of the present disclosure may improve the fuel efficiency of the vehicle using a sensor mounted on the vehicle and a receiver receiving communication data for controlling the driving of the vehicle.

BRIEF DESCRIPTION OF THE DRAWINGS

A brief description of the drawings will be provided to more sufficiently understand the drawings which are used in the detailed description of the present disclosure.

DETAILED DESCRIPTION OF THE EMBODIMENTS

Figure 1:
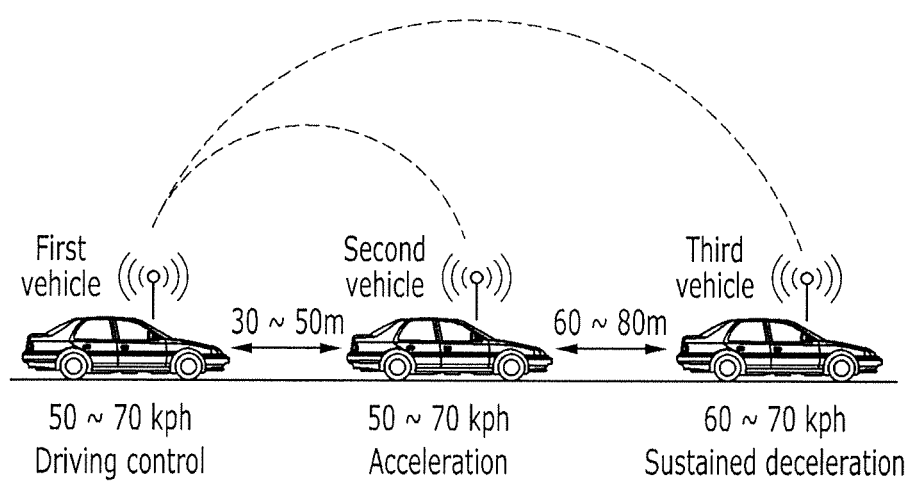
FIG. 1 is a view for explaining a method for controlling driving of a hybrid vehicle using for short-distance forward driving information according to an exemplary embodiment of the present disclosure.

In order to sufficiently understand the present disclosure and the object achieved by embodying the present disclosure, the accompanying drawings illustrating exemplary embodiments of the present disclosure and contents described in the accompanying drawings are to be referenced.

Hereinafter, the present disclosure will be described in detail by describing exemplary embodiments of the present disclosure with reference to the accompanying drawings. In describing the present disclosure, well-known configurations or functions will not be described in detail since they may unnecessarily obscure the gist of the present disclosure. Throughout the accompanying drawings, the same reference numerals will be used to denote the same components.

Terms used in the present specification are only used in order to describe specific exemplary embodiments rather than limiting the present disclosure. Singular forms are to include plural forms unless the context clearly indicates otherwise. It will be further understood that the terms "include" or "have" used in the present specification specify the presence of features, numerals, steps, operations, components, or parts mentioned in the present specification, or a combination thereof, but do not preclude the presence or addition of one or more other features, numerals, steps, operations, components, parts, or a combination thereof.

Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

Since a large amount of information may be processed due to development of a communication system and improvement of processor performance, various kinds of information may be used for economy driving of a vehicle. Therefore, it is necessary to appropriately classify the information that helps improve energy efficiency and to use it at an appropriate time.

A related art improving energy efficiency of an environmentally-friendly vehicle may include a coasting drive control based on precise road map information, a coasting drive control based on radar signals, or a coasting drive control based on a traffic signals. The precise road map may represent a three-dimensional (3D) map which has high accuracy information on a road and geographical features around the road.

It is necessary to classify a driving control method of the vehicle that may be used at present to determine the most efficient control method on an entire travel route of the vehicle in order to improve energy efficiency in the entire travel route. In more detail, even though there are a plurality of energy efficiency control methods at a plurality of points on the entire travel route, only a control based on a single information may be performed, thereby hindering entry into an energy efficiency control on the entire travel route. In other words, it may be necessary to enter a control based on comparison of an energy saving amount according to an effective distance of driving information in front of the vehicle.

FIG. 1 is a view for explaining a method for controlling driving of a hybrid vehicle using forward driving information for a short distance according to an exemplary embodiment of the present disclosure.

Figure 2:
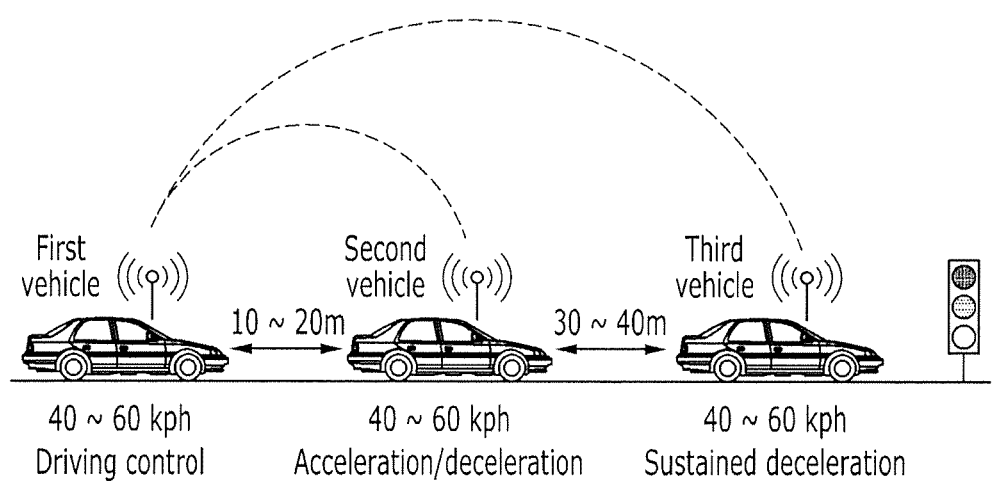
FIG. 2 is a view explaining a method for controlling driving of a hybrid vehicle using for middle-distance forward driving information according to an exemplary embodiment of the present disclosure.
Figure 3:
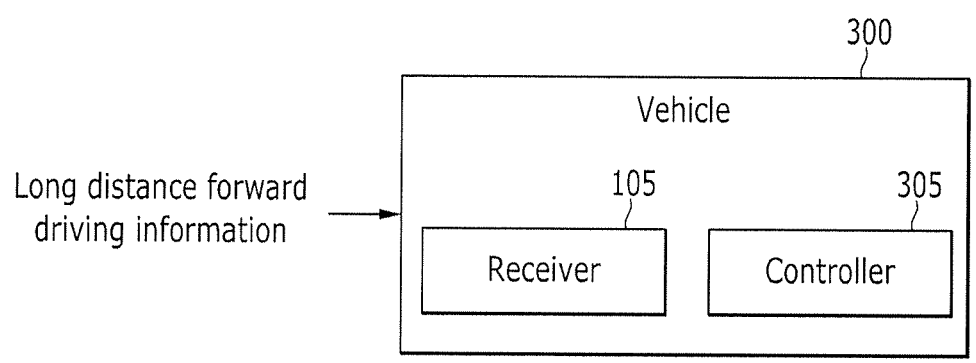
FIG. 3 is a view explaining a method for controlling driving of a hybrid vehicle using long-distance forward driving information according to an exemplary embodiment of the present disclosure.
Figure 4:
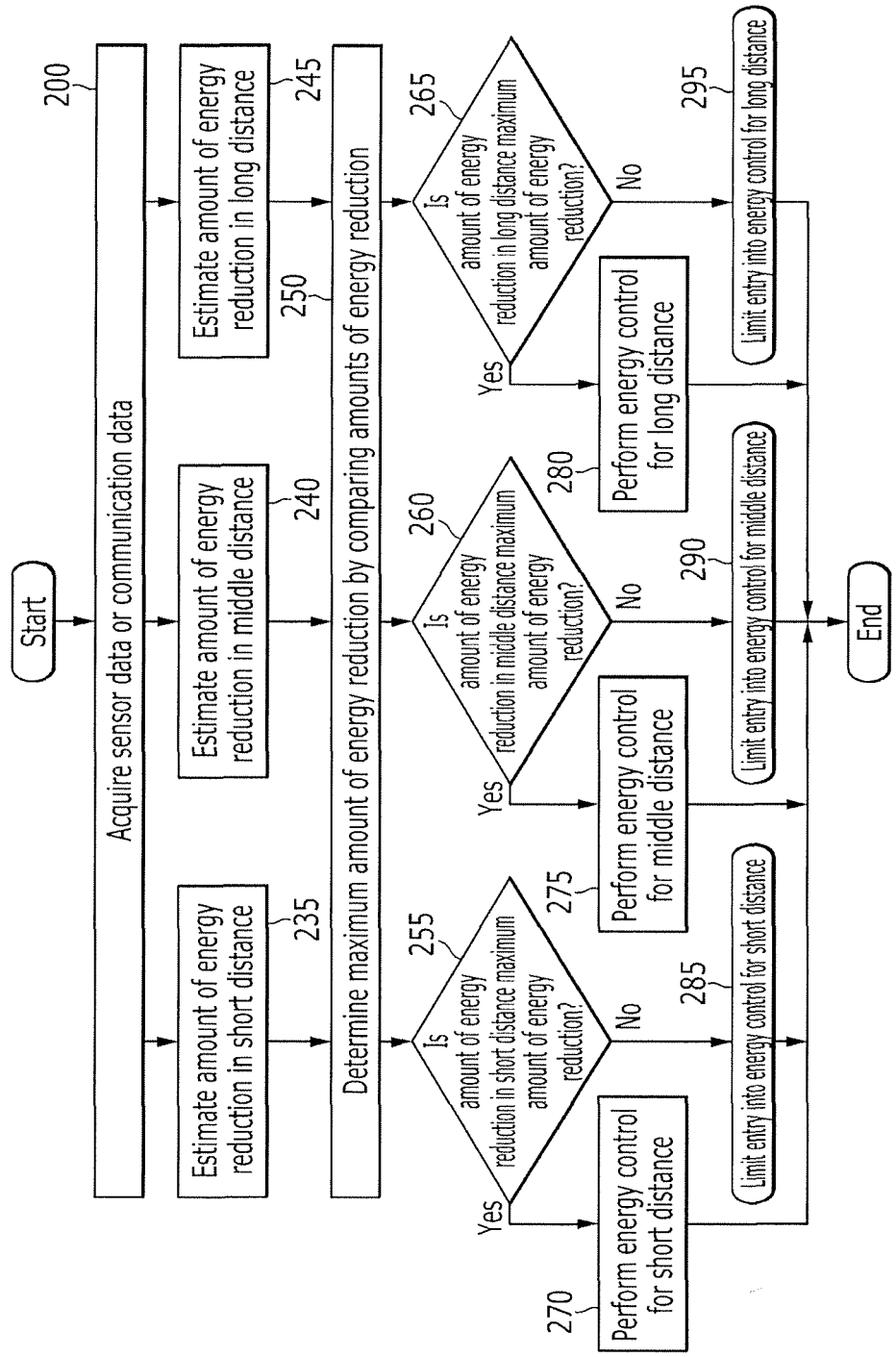
FIG. 4 is a flowchart illustrating a method for controlling driving of a hybrid vehicle according to an exemplary embodiment of the present disclosure.
Figure 5:
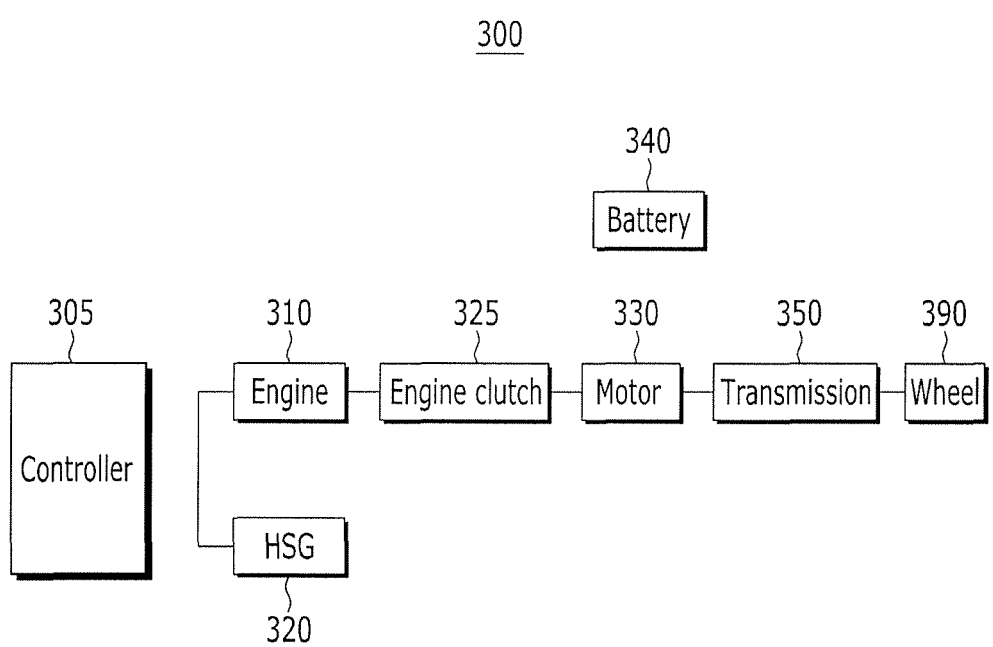
FIG. 5 is a block diagram illustrating a hybrid vehicle to which the method for controlling driving of the hybrid vehicle according to the exemplary embodiment of the present disclosure is applied.

FIG. 2 is a view explaining a method for controlling driving of a hybrid vehicle using forward driving information for a middle distance according to an exemplary embodiment of the present disclosure. FIG. 3 is a view explaining a method for controlling driving of a hybrid vehicle using forward driving information for a long distance according to an exemplary embodiment of the present disclosure. FIG. 4 is a flowchart illustrating a method for controlling driving of a hybrid vehicle according to an exemplary embodiment of the present disclosure. FIG. 5 is a block diagram illustrating a hybrid vehicle to which the method for controlling driving of the hybrid vehicle according to the exemplary embodiment of the present disclosure is applied.

The exemplary embodiment of the present disclosure may classify the driving information in front of a vehicle in order to determine a forward driving state of a hybrid vehicle on a road or a real road to perform energy efficiency control. In more detail, the exemplary embodiment of the present disclosure may control the hybrid vehicle based on a distance or an effective distance of the driving information in front of the vehicle. The effective distance of the driving information may mean an effective use distance of information transmitted through a sensor or communication of the vehicle and may be classified as a short range, a medium range, and a long range.

Referring to FIGS. 1-5, in an acquiring step 200, a controller 305 may use a sensor or a receiver 105 included in a hybrid vehicle 300 to receive sensor data or communication data included in forward driving information or forward driving situation information of the hybrid vehicle 300 based on a distance. The sensor data may indicate a distance between the hybrid vehicle 300 and a preceding vehicle or a forward vehicle of the hybrid vehicle, and the communication data may mean data received in the hybrid vehicle such as data transmitted between the hybrid vehicle and the preceding vehicle. The sensor may include a radar (radio detection and ranging) device, a LIDAR (light detection and ranging) device, or a camera.

For example, the controller 305 may be one or more microprocessors operated by a program or hardware including the microprocessor. The program may include a series of commands for executing the method for controlling driving of the hybrid vehicle according to the exemplary embodiment of the present disclosure. The commands may be stored in a memory.

Referring to FIG. 5, the hybrid vehicle 300 includes the controller 305, an engine 310, a hybrid starter-generator (HSG) 320, an engine clutch 325, a motor (or a driving motor) 330 which may be an electric motor, a battery 340, a transmission 350, and wheels (or driving wheels) 390.

The hybrid vehicle 300, which is a hybrid electric vehicle, may use the engine 310 and the motor 330 as power sources, and includes the engine clutch 325 existing between the engine 310 and the motor 330 so that the hybrid vehicle 300 may be operated in an electric vehicle (EV) mode in which the hybrid vehicle 300 travels by the motor 330 in a state where the engine clutch 325 is opened, and in a hybrid electric vehicle (HEV) mode in which the hybrid vehicle 300 is capable of travelling by both the motor 330 and the engine 310 in a state where the engine clutch 325 is closed.

The hybrid vehicle 300 may include a power train of a transmission mounted electric device (TMED) type in which the motor 330 is connected to the transmission 350. The hybrid vehicle 300 may provide a driving mode, such as the EV mode, which is the electric vehicle mode using only power of the motor, and the HEV mode, which uses rotational force of the engine as main power and uses rotational force of the motor as auxiliary power depending on whether the engine clutch 325 that is disposed between the engine 310 and the motor 330 is engaged (or connected).

In more detail, in the hybrid vehicle 300 including a structure in which the motor 330 may be directly connected to the transmission 350, revolutions per minute (RPM) of the engine may be increased by drive of the HSG 320, power delivery and power cutoff between the engine and the motor may be performed via engagement and release of the clutch 325, a driving force may be transmitted (or transferred) to the wheels 390 through a power transmission system which may include the transmission 350, and torque of the engine may be transmitted to the motor via engagement of the clutch 325 when transmission of the engine torque is requested.

The controller 305 may include a hybrid control unit (HCU), a motor control unit (MCU), an engine control unit (ECU), and a transmission control unit (TCU).

The HCU may control starting of the engine 310 by controlling the HSG 320 when the engine stops. The HCU may be the highest controller, and may synthetically control controllers (for example, the MCU) connected to a network such as a controller area network (CAN) which is a vehicle network, and may control overall operation of the hybrid vehicle 300.

The MCU may control the HSG 320 and the motor 330. The MCU may control an output torque of the driving motor 330 through the network depending on the control signal output from the HCU, and thus may control the motor to operate at maximum efficiency. The MCU may include an inverter configured as a plurality of power switching elements. A power switching element included in the inverter may include an insulated gate bipolar transistor (IGBT), a field effect transistor (FET), a metal oxide semiconductor FET (MOSFET), a transistor, or a relay. The inverter may convert a direct current (DC) voltage that is supplied from the battery 340 into a three-phase alternating current (AC) voltage to drive the driving motor 330. The MCU may be disposed between the battery 340 and the motor 330.

The ECU may control a torque of the engine 310. The ECU may control an operating point (or a driving point) of the engine 310 through the network depending on a control signal output from the HCU, and may control the engine to output an optimal torque. The TCU may control an operation of the transmission 350.

The engine 310 may include a diesel engine, a gasoline engine, a liquefied natural gas (LNG) engine, or a liquefied petroleum gas (LPG) engine, and may output a torque at the operating point depending on a control signal output from the ECU. The torque may be combined with driving force of the driving motor 330 in the HEV mode.

The engine 310 may be connected to the motor 330 via the engine clutch 325 to generate a power transmitted to the transmission 350.

The HSG 320 may operate as a motor depending on a control signal output from the MCU to start the engine 310, and may operate as a generator in a state in which start of the engine 310 is maintained to provide generated electric power to the battery 340 via the inverter. The HSG 320 may be connected to the engine 310 through a belt. The HSG 320, which is a motor that cranks the engine, may be directly connected to the engine.

The engine clutch 325 may be disposed (or mounted) between the engine 310 and the driving motor 330, and may be operated to switch power delivery between the engine 310 and the motor 330. The engine clutch 325 may connect or intercept power between the engine and the motor depending on switching of the HEV mode and the EV mode. Operation of the engine clutch 325 may be controlled by the controller 305.

The motor 330 may be operated by a three-phase AC voltage that is output from the MCU to generate a torque. The motor 330 may be operated as a generator during coasting drive or regenerative braking to supply a voltage (or regenerative energy) to the battery 340.

The battery 340 may include a plurality of unit cells. A high voltage for providing a driving voltage (for example, 350-450 V DC) to the motor 330 that provides driving power to the wheels 390 or the HSG 320 may be stored in the battery 340.

The transmission 350 may include a multiple speed transmission, such as an automatic transmission or a dual clutch transmission (DCT), or a continuously variable transmission (CVT), and may shift to a desired gear by using hydraulic pressure depending on control of the TCU to operate engagement elements and disengagement elements. The transmission 350 may transmit driving force of the engine 310 and/or the motor 330 to the wheels 390, and may intercept power delivery between the motor 330 (or the engine 310) and the wheels 390.

According to an estimating step 235, the controller 305 may calculate an amount of short distance energy reduction of the hybrid vehicle 300 based on the sensor data or the communication data. For example, the controller 305 may calculate the amount of short distance energy reduction when the hybrid vehicle 300 is maintained in the EV mode in which the engine 310 is not used and only the driving motor 330 is used, as shown in FIG. 1.

Referring to FIG. 1, the controller 305 of a first vehicle 300 may control driving of the vehicle based on short distance driving information of a second vehicle traveling at a short distance in front of the first vehicle and short distance driving information of a third vehicle traveling at a short distance in front of the first vehicle. The short distance driving information of the second vehicle and the short distance driving information of the third vehicle may be received via the receiver 105. In more detail, the controller 305 may respond not to the sensor data about the second vehicle but to the communication data (e.g., deceleration information of the third vehicle) to hold the EV mode without unnecessarily turning on the engine 310. The communication data may be data due to vehicle to vehicle communication between the first vehicle and the third vehicle. Therefore, energy consumption of the first vehicle 300 may be reduced.

According to an estimation step 240, the controller 305 may calculate an amount of middle distance energy reduction of the hybrid vehicle 300 based on the communication data. For example, as shown in FIG. 2, the controller 305 may calculate the amount of middle distance energy reduction when the hybrid vehicle performs regenerative braking or active regenerative braking, based on middle distance driving information which is the communication data. The active regenerative braking may mean the regenerative braking with the vehicle's target speed. When an off state of a brake pedal and an off state of an accelerator pedal are maintained by a driver of the vehicle for deceleration of the hybrid vehicle 300, coasting drive of the vehicle may be performed. When coasting drive of the vehicle is performed, the vehicle may be decelerated according to a coasting torque control for the driving motor 330 without braking of the hybrid vehicle by a brake and energy collected by the driving motor may be stored in the battery 340. A coasting torque may be a negative torque.

The middle distance driving information may be information by vehicle-to-everything communication (V2X), and may include traffic signal information, toll gate position information, turning position information for the vehicle, or uphill road position information that is transferred through communication from a server (e.g., a telematics server) disposed outside the hybrid vehicle 300.

Referring to FIG. 2, the controller 305 of the first vehicle 300 may control driving of the first vehicle 300 based on traffic signal information of a traffic light that is disposed at a middle distance in front of the first vehicle and is received through the receiver 105. In more detail, the controller 305 may decelerate the first vehicle 300 to control regenerative braking of the vehicle in response to a red traffic light signal, which is the traffic signal information, without responding to driving information of the second vehicle. Thus, energy consumption of the first vehicle 300 may be reduced.

According to an estimation step 245, the controller 305 may calculate an amount of long distance energy reduction of the hybrid vehicle 300 based on the communication data. For example, the controller 305 may calculate the amount of long distance energy reduction when the hybrid vehicle travels in the EV mode or performs regenerative braking or active regenerative braking, based on long distance driving information which is the communication data.

In another embodiment of the present disclosure, an amount of long distance energy reduction based on a time may be calculated or estimated by the following equation.

$$\int_0^t ((\text{Air resistance power} + \text{Rolling resistance power} + \text{Gradient resistance power}) * \eta_{DT} * \eta_{TM} * \eta_{Mot} * \eta_{Bat})^{dt}$$

In the above equation, the air resistance power may be power of the hybrid vehicle 300 corresponding to air resistance that occurs when the vehicle travels, the rolling resistance power may be power of the hybrid vehicle 300 corresponding to air resistance that occurs when the vehicle travels, the gradient resistance power may be power of the hybrid vehicle 300 corresponding to gradient resistance that occurs when the vehicle travels, the $\eta_{DT}$ may be efficiency of a differential gear device disposed between the transmission 350 and the wheels 390, the $\eta_{TM}$ may be efficiency of the transmission 350, $\eta_{Mot}$ may be efficiency of the driving motor 330, and the $\eta_{Bat}$ may be the efficiency of the battery 340.

An amount of long distance energy reduction based on a distance may be calculated or estimated by the following equation.

$$\int_0^s ((\text{Air resistance power} + \text{Rolling resistance power} + \text{Gradient resistance power}) * \eta_{DT} * \eta_{TM} * \eta_{Mot} * \eta_{Bat})^{ds}$$

Referring to FIG. 3, the controller 305 of the hybrid vehicle 300 may control driving of the hybrid vehicle based on the long distance driving information or long distance forward driving information received via the receiver 105. The long distance driving information may be information by vehicle-to-everything communication (V2X), and may include traffic flow information (e.g., traffic jam), road inclination information, road curvature information, road surface state information, precise road map information such as high-precision map information, or position information by a global positioning system (GPS), which is transmitted through communication from a server (e.g., a telematics server) disposed outside the hybrid vehicle 300.

According to a comparison step 250, the controller 305 may determine a maximum amount of energy reduction by comparing the amount of energy reduction in the short distance, the amount of energy reduction in the middle distance, and the amount of energy reduction in the long distance.

According to a determination step 255, the controller 305 may determine whether the amount of energy reduction in the short distance is the maximum amount of energy reduction.

The method for controlling driving of the hybrid vehicle which is a process proceeds to a performing step 270 when the amount of energy reduction in the short distance is the maximum amount of energy reduction. The process proceeds to a limiting step 285 when the amount of energy reduction in the short distance is not the maximum amount of energy reduction.

According to the performing step 270, the controller 305 may control the hybrid vehicle 300 to travel based on the amount of energy reduction in the short distance. For example, as shown in FIG. 1, the controller 305 may control the hybrid vehicle 300 to travel in the EV mode based on the short distance driving information (or driving information of nearby vehicles around the first vehicle 300) that is the communication data.

According to the limiting step 285, the controller 305 may control the hybrid vehicle 300 not to travel based on the amount of energy reduction in the short distance.

The process proceeds to a performing step 275 when it is determined at a determination step 260 that the amount of energy reduction in the middle distance is the maximum amount of energy reduction. The process proceeds to a limiting step 290 when the amount of energy reduction in the middle distance is not the maximum amount of energy reduction.

According to the performing step 275, the controller 305 may control the hybrid vehicle 300 to travel based on the amount of energy reduction in the middle distance. For example, as shown in FIG. 2, the controller 305 may control the hybrid vehicle 300 to perform regenerative braking or active regenerative braking based on the middle distance driving information (e.g., traffic signal information) which is the communication data.

According to the limiting step 290, the controller 305 may control the hybrid vehicle 300 not to travel based on the amount of energy reduction in the middle distance.

The process proceeds to a performing step 280 when it is determined at a determination step 265 that the amount of energy reduction in the long distance is the maximum amount of energy reduction. The process proceeds to a limiting step 295 when the amount of energy reduction in the long distance is not the maximum amount of energy reduction.

According to the performing step 280, the controller 305 may control the hybrid vehicle 300 to travel based on the amount of energy reduction in the long distance. For example, as shown in FIG. 3, the controller 305 may control the hybrid vehicle 300 to travel in the EV mode or to perform regenerative braking or active regenerative braking based on the long distance driving information (e.g., traffic flow information, road inclination information, or road curvature information) included in the communication data.

According to the limiting step 295, the controller 305 may control the hybrid vehicle 300 not to travel based on the amount of energy reduction in the long distance.

The components, "~ unit", block, or module which are used in the present exemplary embodiment may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

As set forth above, exemplary embodiments have been disclosed in the accompanying drawings and the specification. Herein, specific terms have been used, but are just used for the purpose of describing the present disclosure and are not used for qualifying the meaning or limiting the scope of the present disclosure, which is disclosed in the appended claims. Therefore, it will be understood by those skilled in the art that various modifications and equivalent exemplary embodiments are possible from the present disclosure. Accordingly, the actual technical protection scope of the present disclosure must be determined by the spirit of the appended claims.

What is claimed is:

1. A method for controlling driving of a first vehicle, comprising:

calculating, by a controller, a short distance energy reduction amount, a middle distance energy reduction amount, and a long distance energy reduction amount of the first vehicle based on forward driving information of the first vehicle;

comparing, by the controller, the short, middle, and long distance energy reduction amounts and determining a maximum value among the compared short distance, middle distance, and long distance energy reduction amounts to be a maximum energy reduction amount; and controlling, by the controller, the first vehicle to travel based on the maximum energy reduction amount.

2. The method of claim 1, further comprising:

receiving, by the controller, the forward driving information, wherein the forward driving information includes sensor data indicating a distance between the first vehicle and a forward vehicle of the first vehicle or communication data received in the first vehicle.

3. The method of claim 2, wherein the controlling of the first vehicle comprises:

controlling, by the controller, the first vehicle to travel in an electric vehicle mode based on short distance driving information that is the communication data.

4. The method of claim 3, wherein the short distance driving information is the communication data between the first vehicle and the forward vehicle of the first vehicle.

5. The method of claim 2, wherein the controlling of the first vehicle comprises:

controlling, by the controller, the first vehicle to perform regenerative braking based on middle distance driving information which is the communication data.

6. The method of claim 5, wherein the middle distance driving information includes traffic signal information.

7. The method of claim 2, wherein the controlling of the first vehicle comprises:

controlling, by the controller, the first vehicle to travel in an electric vehicle mode based on long distance driving information that is the communication data.

8. The method of claim 7, wherein the long distance driving information includes traffic flow information.

9. The method of claim 2, wherein the controlling of the first vehicle comprises:

controlling, by the controller, the first vehicle to perform regenerative braking based on long distance driving information that is the communication data.

* * * * *